(No Model.) 3 Sheets—Sheet 2.

J. W. PETERS.
FIRE ESCAPE MECHANISM FOR BARNS.

No. 411,834. Patented Oct. 1, 1889.

WITNESSES:
Geo. B. Fravel
John H. Fravel

INVENTOR
J. Wilson Peters,
BY C. C. Shepherd.
ATTORNEY (No Model.) 3 Sheets—Sheet 3.
J. W. PETERS.
FIRE ESCAPE MECHANISM FOR BARNS.
No. 411,834. Patented Oct. 1, 1889.
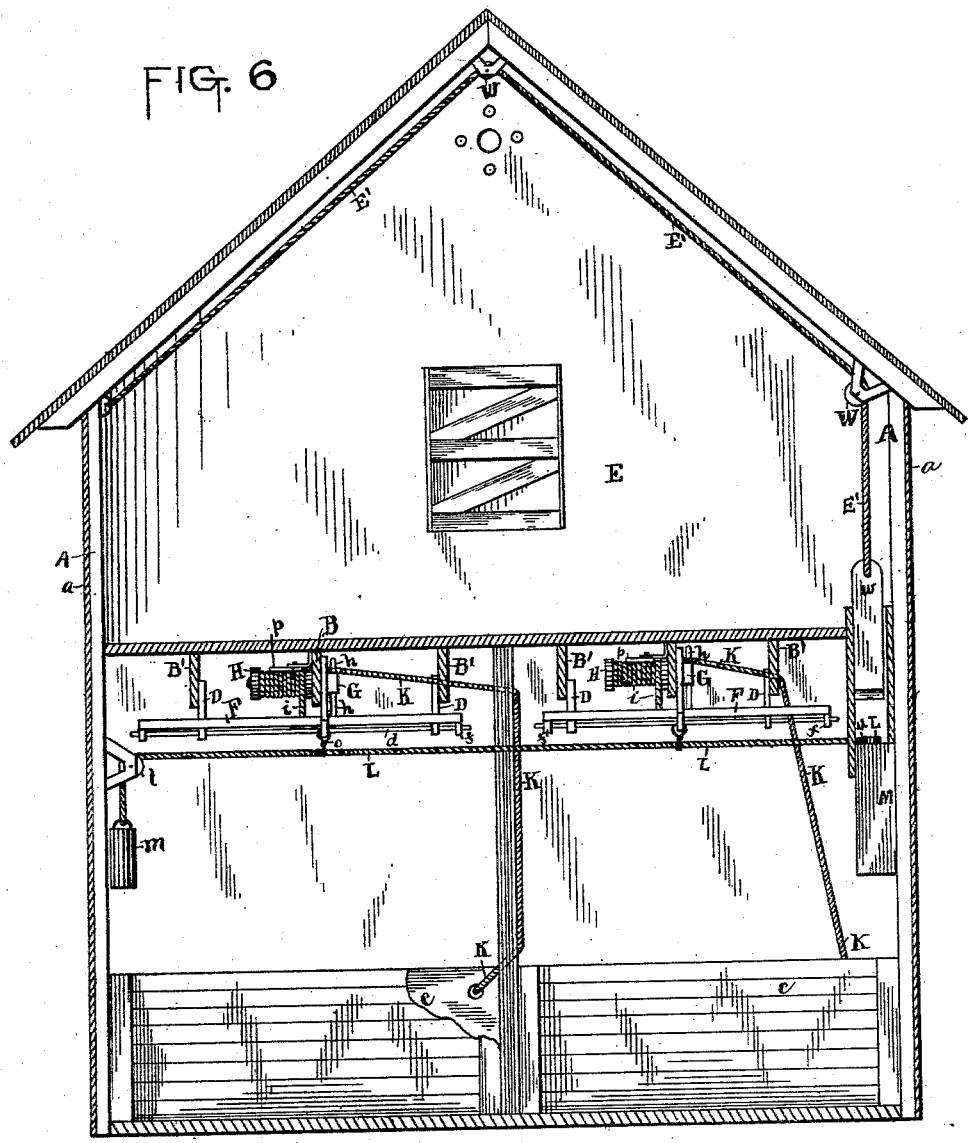
FIG. 6
FIG. 7
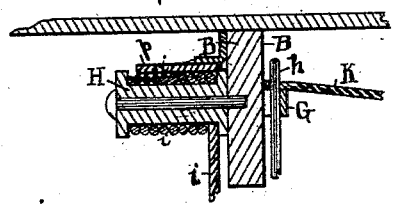
WITNESSES:
John Travel.
Frances H. Shepherd.
INVENTOR
J. Wilson Peters
BY C. C. Shepherd
ATTORNEY

UNITED STATES PATENT OFFICE.

J. WILSON PETERS, OF GALLOWAY, OHIO.

FIRE-ESCAPE MECHANISM FOR BARNS.

SPECIFICATION forming part of Letters Patent No. 411,834, dated October 1, 1889.

Application filed May 3, 1889. Serial No. 309,442. (No model.)

*To all whom it may concern:*

Be it known that I, J. WILSON PETERS, a citizen of the United States, residing at Galloway, in the county of Franklin and State of Ohio, have invented a certain new and useful Improvement in Fire-Escape Mechanism for Barns, of which the following is a specification.

This invention relates to means for automatically liberating horses and other animals from a burning stable; and the objects of my invention are to provide the frame-work of a stable with mechanism by means of which a horse or other animal is automatically unhitched and forced from his stall in case of fire, to combine therewith means for automatically unlocking and opening the stable door or doors, and to produce said mechanism in a simple and inexpensive form. These objects I accomplish in the manner illustrated in the accompanying drawings, in which—

Figure 1:
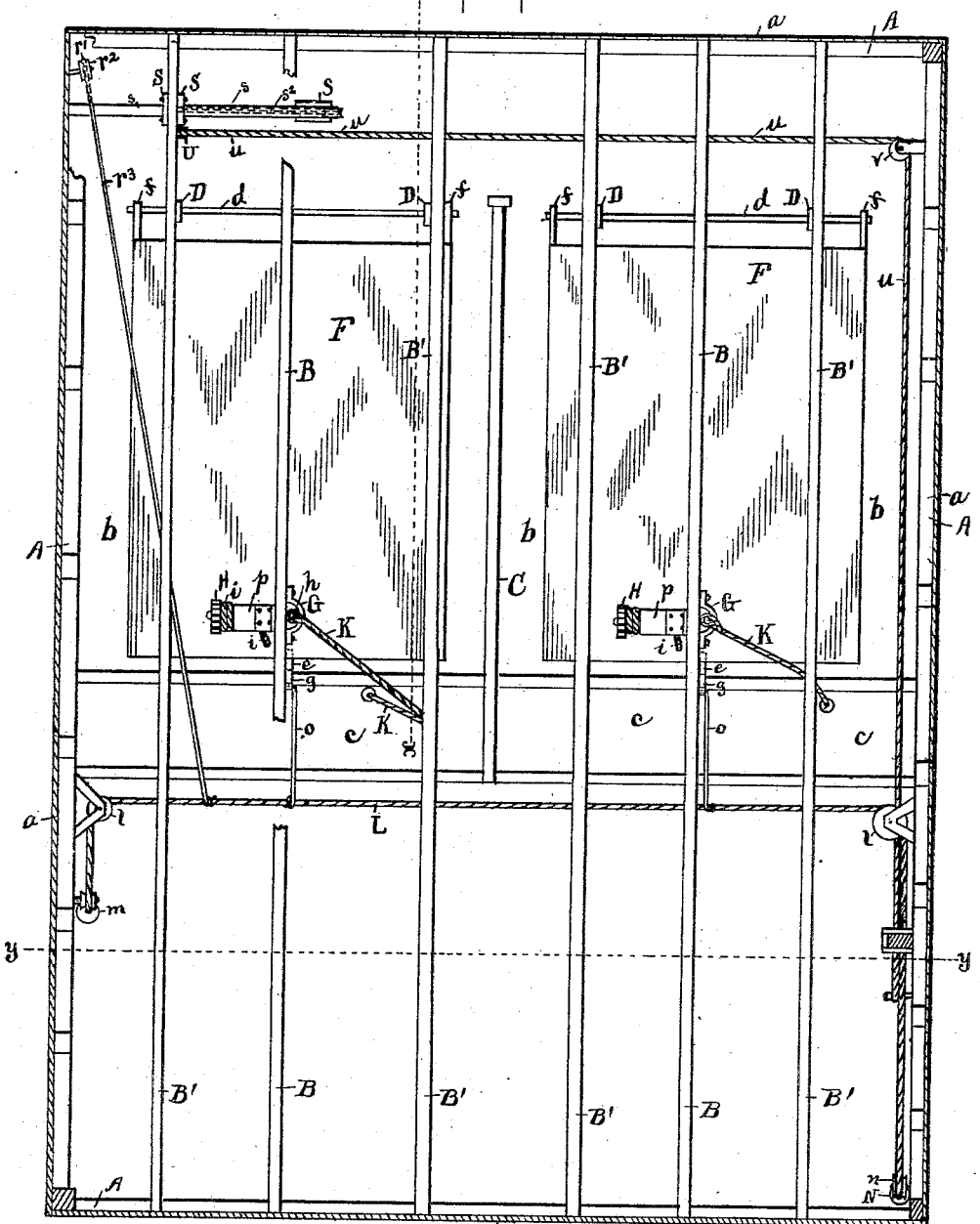
Figure 2:
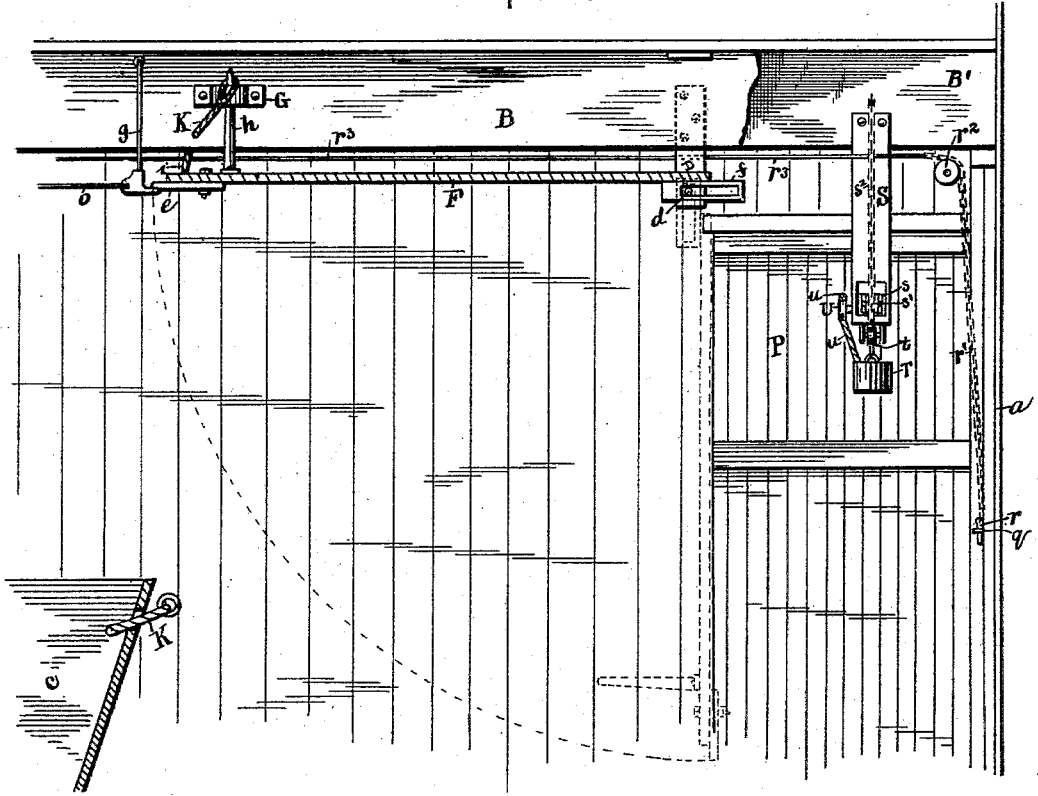
Figure 3:
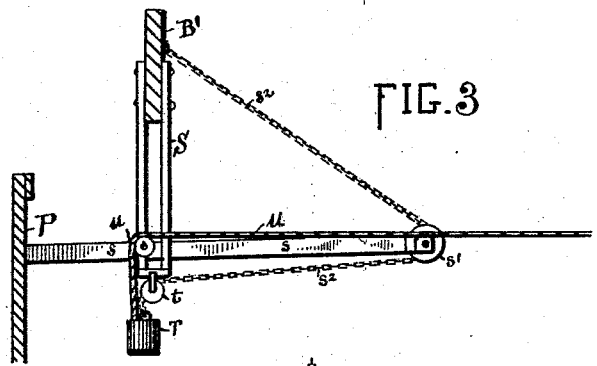
Figure 4:
Figure 5:
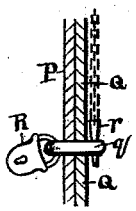

Figure 1 is a horizontal section of a stable, taken immediately beneath the floor of the mow. Fig. 2 is a sectional view taken on line $x$ $x$ of Fig. 1. Fig. 3 is a side elevation, in detail, of the door-opening mechanism. Fig. 4 is a plan view of the door-locking link. Fig. 5 is a sectional view of a portion of the stable-door and frame, showing the locking-link secured therein. Fig. 6 is a vertical section taken through the stable-building on line $y$ $y$ of Fig. 1. Fig. 7 is a sectional view in detail, taken through one of the joists and through a stationary reel and keeper secured thereto.

Similar letters refer to similar parts throughout the several views.

For convenience in describing my invention I will refer to that portion of the stable containing the stalls as the "rear" end, and that portion in front of said stalls as the "front" end.

A represents that portion of the frame-work of a barn or stable to which is secured the siding $a$.

B represents the joists which run approximately over the center of the stalls, and B′ the remaining joists, said joists supporting the floor of the second story or mow, and, for convenience, being shown running parallel with the length of the stalls.

$b$ represents the stalls, of which but two are shown; C, the usual partition between said stalls, and $c$ the mangers, all of which are constructed in the usual manner.

Secured to the joists B′ on each side of the joists B, at opposite points over the rear portion of each of the stalls or the flooring above said joists, are the upper ends of two short downwardly-extending arms D, having pivotally supported in their lower portions a transverse rod $d$.

F represents a swinging door or platform supported horizontally, as hereinafter described, beneath the joists B B′ and in the upper portion of each of the stalls. The rear end of each of these doors F is provided, adjoining its side, with short rearwardly-extending and longitudinally-slotted arms $f$, through the slots of which passes loosely the end of the rod $d$, thus hinging said door F thereto. Each of the doors F, when supported horizontally, is of such length as to have its forward end terminating approximately over the front end of the stall, and has projecting from its front end, at the center of its width, a short tongue $e$, which, as shown, is adapted to be made to rest upon the rearwardly-bent lower end of a trigger-rod $g$, made to depend from the joists B, to which said rod has its upper end pivotally secured. This trigger-rod extends such distance below the joists as to hold the front end of the swinging door in horizontal alignment with its rear end, as shown.

Made to project upwardly from the upper surface of each of the doors F, at about the center of its width and near its front end, is a vertical pin $h$. This pin, when the door F is elevated, as shown in Figs. 1, 2, and 5 of the drawings, extends loosely through a suitable metal keeper or guide G on one side of the joists B.

H represents a cylindrical reel or spool rigidly secured on a pin made to project outwardly from the joists B on that side opposite the keeper G. Coiled about this reel H is a rope $i$, the free end of which extends downwardly and is secured to the forward end of the door F.

K represents the rope or cord usually secured to the halter of the horse, and by means of which the horse is usually secured to the manger. From the halter this cord K passes through an opening formed in the rear side of the manger, and thence, extending upwardly, passes through a hole formed in one of the frame-pieces of the barn, preferably in one of the joists B', as shown, from which it extends to the upper end of the vertical pin $h$, over which it is looped.

L represents a rope, which is suspended, as shown, across the barn beneath the joists B B' and in front of the mangers $c$. This rope L, passing over one or more pulleys $l$, supported from the frame-work of the barn, has on one of its ends a weight $m$, the latter being suspended at a distance from the floor. The remaining portion of the rope L, passing around one or more pulleys, is extended along one side of the barn, and, passing over and resting upon the upper end of a vertical block M, secured to the inner side of the barn, passes over a pulley $n$, and has secured to the end thereof a weight N, the latter being suspended at a distance from the floor.

To the lower end of each of the trigger-rods $g$ is secured one end of a wire $o$, the remaining end of which is secured to the rope L.

Hinged to the side of each of the joists B above the reel H is a short horizontal brake-block $p$, which is allowed to rest upon the coiled rope about said reel. The hinge which connects said brake-block and joists is preferably formed of leather in order that the brake may be kept pressed against said coiled rope.

P represents the stable-door, which is usually located, as shown, at a point opposite the rear of the stalls.

Q represents the door-frame against which said door closes.

$q$ represents an oblong locking-link having a central cross-bar $q'$, as shown. This link $q$ is adapted to be inserted through oppositely-located holes formed in the door P and frame Q. To the outwardly-projecting end of said locking-link may be secured, as shown in Fig. 5 of the drawings, a padlock R, while through the inner projecting end of said link may be inserted a pin $r$. To the upper end of this pin $r$ is secured one end of a chain $r'$, which, extending upwardly, passes over a pulley $r^2$, supported by the frame-work of the barn. To the upper end of this chain $r'$ is secured one end of a horizontal wire $r^3$, which, extending forwardly, has its remaining end secured to the rope L.

S represents two vertical arms having their upper ends secured to opposite sides of one of the joists B' and having their lower ends terminating at points opposite the upper portion of the door P. Formed in the lower portions of the arms S are oppositely-located holes, through which is made to pass a sliding arm $s$, the front end of which normally bears against the inner side of the door P, and the rear portion of which terminates at a point some distance in rear of said arms S. Pivotally supported on the inner end of the arm $s$ is a pulley-wheel $s'$. Secured to the frame-work of the barn, at a point preferably above said arm $s$, as shown, is one end of a chain $s^2$, which, extending downwardly and rearwardly, passes over the pulley $s'$, and thence, extending forwardly beneath the sliding arm $s$, passes over a pulley $t$, suspended beneath the lower ends of the arms S, from which pulley said chain extends downwardly a short distance and is connected with a weight T. Also secured to said weight T is a supporting-rope $u$, which, extending upwardly, passes over a pulley-wheel U, pivotally supported on one edge of one of the arms S, from which point said rope $u$ extends transversely across the barn in the rear of the stalls $b$, and, passing about a pulley $v$, supported from the frame-work, it extends forwardly along the side of the barn, and, passing over the block M by the side of the rope L, is secured to a pin or other projection from the inner side of the barn.

E represents the upper story or mow of the barn, to the frame-work of which is secured one end of a rope E', which, being made to pass through or about said upper story one or more times and passing over pulleys W, supported from the frame-work, is finally allowed to hang down one side of the mow at a point vertically above the opposite end of the block M. On this hanging end of said rope E' is suspended a heavy metallic blade $w$, having its lower end sharpened to form a knife. This blade $w$ is preferably loosely incased in suitable boxing and is made to project through an opening formed in the floor of the mow in such manner as to cause it to be suspended a short distance above the block M and the ropes L and $u$, resting on said block.

The above-described ropes are preferably tarred or otherwise coated to increase their inflammability.

The operation of my invention is as follows: The mechanism being in the position shown in full lines in the drawings and as herein described, and a fire occurring in the lower room of a barn, it will be seen that the fire will quickly reach the rope L at one or more points, which, owing to its inflammable nature, will quickly be burned through, allowing the weights N and $m$ to drop to the ground. The movement thus caused by the severed portions of the rope L will operate to pull forward the wires $o$ and $r^3$ connected therewith. This movement of the wire $o$ will force the trigger $g$ from contact with the door F or its projecting tongue $e$, thus allowing the forward portion of said door to descend, its rear end being supported, as described, on the rod $d$. As the door descends it will be seen that the rope $i$ will be gradually uncoiled from the reel H, the friction between the rope and reel and the brake-block operating to prevent the too rapid descent of the door. This downward movement of the forward portion of the door will cause the pin $h$ to be withdrawn from the keeper G and thus disconnect the rope K therefrom. The descending door coming in contact with the horse's head, it will be seen that the animal will be driven backward out of the stall, the rope K to which he is hitched being drawn downward through the frame-work through which it passes and remaining attached to the halter. It will be seen that when the door has reached a vertical position, as shown in the dotted lines of Fig. 2 of the drawings, the horse will be driven completely from the stall. The movement of the wire $r^3$, as described, will operate to draw upward the chain $r'$ sufficiently to withdraw the door-locking pin $r$ from the inner end of the link $q$. The fire having severed the rope $u$, which supports the weight T, it will be seen that said weight T will be allowed to descend, which descent will operate through the chain $s^2$, which is pulled downward by said weight to cause the sliding arm $s$ to travel forward in its bearings in the hanging arms S. This forward movement of the arm $s$ will operate to press the door P, against which it rests when the door is closed, open sufficiently to allow the horse or horses to escape therethrough. The door-locking pin $r$ having been drawn from the link $q$, as hereinbefore described, it will be seen that said link will be released from connection with the door-frame, and that it will be carried outward therefrom when the door P is pressed open. Owing to the locking-link being formed solid at its center, the link-hole will be so filled as to prevent the raising of the locking-pin by the insertion of any instrument through the link-hole from the outside.

In case fire should first occur in the upper story of the barn it will be seen that, the rope E' being severed thereby, the sharpened weight $w$ will be allowed to descend by gravity until it meets and severs the ropes L and $u$, resting upon the block M. Thus it will be seen that the horse or horses may be released and driven from their stalls and the stable-door unlocked and opened before the fire reaches the lower floor.

It is obvious that the weight-supporting ropes may be made to run one or more times about and across the barn, as may be deemed necessary to expose them to the fire.

By the use of the slotted extension-arms $f$ it will be seen that, the swinging doors F having descended to a vertical position, the rod $d$ will bear within the rear or upper end of the slots of said extensions and thus admit of a short door being used.

It will be observed that the herein-described swinging doors and the releasing and supporting mechanism connected therewith may be applied to any number of stalls desired. The door-opening mechanism may also be applied to one or more stable or carriage-room doors.

I may employ suitable fuses to communicate fire to the ropes, so made as to burn rapidly and so arranged around the barn as to increase the liability of their coming into contact with the fire.

By the herein-described construction and operation the door or stable is unlocked and opened and the horse released from his stall and driven therefrom automatically.

Having now fully described my invention, what I claim, and desire to secure by Letters Patent, is—

1. In a fire-escape mechanism for barns, the combination, with the frame-work, the swinging doors F, pivotally connected at their rear ends with the frame-work above the stalls and having pins $h$, projecting upwardly therefrom and through keepers G, secured to the joists B, and halter-ropes K, looped over the upper ends of said pins $h$, of the hanging triggers $g$, the latter detachably supporting said swinging doors, as described, rope L, supporting weights $m$ N, and wires $o$, connecting said rope L and triggers $g$, substantially as described.

2. In a fire-escape mechanism for barns, the combination, with the frame-work, the swinging doors F, pivotally connected at their rear ends with the frame-work above the rear ends of the stalls, pins $h$, projecting upwardly through keepers G on said upper frame-work, halter-ropes K, looped over the upper ends of said pins, stationary reels H, their brake-blocks $p$, and ropes $i$, the latter connecting with the doors F, of the hanging triggers $g$, detachably supporting the front ends of said doors, as described, rope L, running over pulleys and supporting weights N and $m$, and wires $o$, connecting said rope and triggers, substantially as and for the purpose set forth.

3. In a fire-escape mechanism for barns, the combination, with the frame-work of a barn, stable-door P, door-frame Q, and locking-link $q$, passing through said door and frame, of a padlock clasped to the outer end of said link, locking-pin $r$, chain $r'$, connected with said locking-pin, rope L, supporting, as described, weights N and $m$, and wire $r^3$, connecting said rope L and chain $r'$, substantially as and for the purpose specified.

4. In a fire-escape mechanism for barns, the combination, with the frame-work of a barn, door P, and arms S, depending from joists in front of the rear side of said door and supporting pulleys $t$ and U, of the horizontal sliding arm $s$, supported in the lower ends of said arm S, pulley $s'$, pivoted in the outer ends of said arm $s$, weight T, rope $u$, passing over pulley U and supporting said weight, and chain $s^2$, secured at one end to the frame-work above arm $s$ and at its remaining end to the weight T and passing over pulleys $s'$ and $t$, substantially as and for the purpose set forth.

5. In a fire-escape mechanism for barns, the combination, with the frame-work of a barn, of swinging doors F, pivotally supported at their rear ends above the rear ends of the stalls b and detachably supported at their forward ends on hanging triggers g, rope L, supported from the barn frame-work on pulleys, weights m and N, supported by said rope, wires o, connecting said rope L and triggers g, and block M, over which said rope passes, the rope E, having one end secured to the frame-work of the hay-mow and passing over pulleys suspended from said frame-work, and sharpened weight w, suspended by said rope E within an opening formed in the floor of the mow and above the block M, substantially as set forth.

J. WILSON PETERS.

In presence of—
  C. C. SHEPHERD,
  JOHN FRAVEL.